Figures 1, 2:
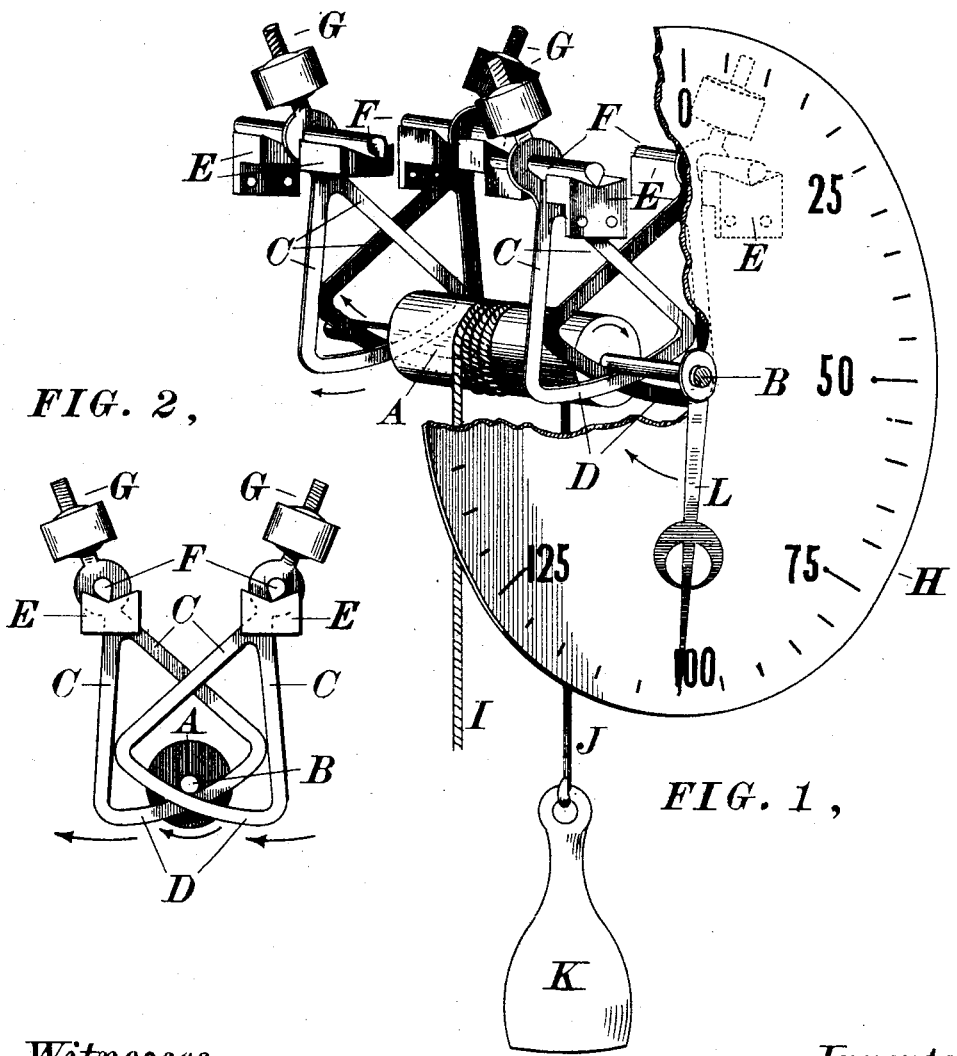

(No Model.)

O. B. JOHNSON.
ANTIFRICTION BEARING.

No. 534,833. Patented Feb. 26, 1895.

Witnesses,
W. H. Sargent.
K. Fairbanks.

Inventor,
Orville B. Johnson
By Chas. L. Sturtevant
Attorney.

United States Patent Office.

ORVILLE B. JOHNSON, OF ST. JOHNSBURY, VERMONT, ASSIGNOR TO THE E. & T. FAIRBANKS & COMPANY, OF SAME PLACE.

ANTIFRICTION-BEARING.

SPECIFICATION forming part of Letters Patent No. 534,833, dated February 26, 1895.

Application filed October 17, 1894. Serial No. 526,152. (No model.)

*To all whom it may concern:*

Be it known that I, ORVILLE B. JOHNSON, a citizen of the United States, residing at St. Johnsbury, in the county of Caledonia, State of Vermont, have invented certain new and useful Improvements in Antifriction-Bearings, of which the following is a description, reference being had to the accompanying drawings, and to the letters of reference marked thereon.

My invention relates to an improvement in bearings for shafts, the object being primarily to provide an anti-friction bearing for rocking shafts or shafts making a limited number of revolutions.

While I have designed the present invention for use especially in connection with an automatic weighing scale, as a bearing for the indicator shaft, which indicator works in connection with a suitable dial; it will be understood that said invention is not limited entirely to such application, but the bearing may be useful in connection with other apparatus.

The invention consists principally of two balanced hangers swinging upon suitable supports, and a shaft supported on said hangers.

Secondly it consists of two balanced hangers swinging upon knife edges, said knife edges being parallel to the axis of the shaft which is supported by the hangers, and at a considerable distance above said shaft.

Thirdly it consists of balanced hangers supported on pivots in the same horizontal plane but in different vertical planes, a shaft supported on said hangers in a vertical plane between the vertical planes of the pivots, that portion of the hangers upon which the shaft rests being a curved surface whose axis coincides with the knife edge upon which the hangers swing, and the radius of this curved surface being the same in the two hangers which constitute the bearing, so that as the shaft is rotated its axis will not change position.

Fourthly the invention consists of a rotatable shaft, swinging hangers supported on knife edge pivots on either side the vertical plane of the shaft, the planes of said hangers intersecting, said shaft being supported at their point of intersection.

Fifthly the invention consists in the hangers supported on knife edges, and having lower curved surfaces, which surfaces intersect, and a shaft supported on said curved surfaces at their point of intersection.

Finally the invention consists in the various matters hereinafter described and referred to in the appended claims.

In the accompanying drawings, which illustrate the invention, Figure 1 represents it in perspective; and Fig. 2 is a detail view of two supporting hangers with one end of the roller or shaft supported thereon.

In the drawings A represents a roller or drum upon an axis or shaft B to one end of which is secured the indicator or pointer L working on the face of a graduated disk or dial H. Upon the drum or roller A is wound a rope or chain I connected at one end with the working mechanism (not shown) of an automatic scale, while to the opposite end is hung a counterweight K whereby when strain on the rope I is relaxed the weight will exert its force to rotate the roller and move the pointer L.

As a bearing for either end of the axis of the shaft B of the roller A I provide the triangular hangers C having knife edge pivots F supported on the blocks E secured to any suitable support. The knife edge pivots of these hangers are in the same horizontal plane but in different vertical planes. Said hangers extend downwardly in an oblique plane and the shaft B passes at either end through both hangers and is therefore supported at the point of intersection of said hangers, the lower portion of each being a curved surface D whose axis coincides with the knife edge upon which the hanger swings. The radius of this curved surface is of course the same in both hangers so that as the shaft is rotated it will not change position. These hangers are balanced in their oblique position by the weights G adjustable on the screw threaded upper ends of said hangers.

It will be understood that so far as the results produced by my invention are concerned, namely, lack of friction and constant position of the axis of the shaft, these may be secured by arranging the hangers in other ways, and I do not wish to be limited to the exact details herein shown and described.

It will be seen that by my invention the position of the axis of the roller remains constant and that the amount of friction of the same on its bearing surfaces is reduced to a minimum. While I have herein shown the hangers as supporting the shaft near the end thereof, it will be understood that they may be arranged in any suitable position, and that if more than two bearings are to be supplied, an additional hanger or hangers may be arranged at intermediate points. I therefore intend to claim the device broadly without regard to its position with respect to the ends of the shaft.

Having thus described my invention, what I claim, and desire to secure by Letters Patent, is—

1. In combination with a shaft an anti-friction bearing therefor comprising hangers swinging upon suitable pivots, said pivots being parallel to the axis of said shaft in a different horizontal plane therefrom and upon opposite sides of the vertical plane of said axis; substantially as described.

2. In combination with a shaft to be supported, an anti-friction bearing comprising balanced hangers having their pivot points in planes upon opposite sides of the plane of the axis of the shaft, said hangers being arranged so that their planes intersect, the shaft being supported on both hangers at the point of intersection of their planes; substantially as described.

3. In combination with a shaft, an anti-friction bearing comprising balanced hangers supported on knife edge pivots in the same horizontal plane, but in different vertical planes, said shaft being supported on said hangers in a vertical plane between the vertical planes of the pivots, that portion of the hangers upon which the shaft rests being a curved surface whose axis coincides with the knife edge upon which the hanger swings, the radius of this curved surface being the same in the two hangers which constitute the bearing for either end of the shaft, whereby when the shaft is rotated, its axis will not change position; substantially as described.

4. An anti-friction bearing for either end of a shaft comprising two swinging obliquely arranged hangers pivoted upon opposite sides of the vertical plane of the axis of the shaft, means for balancing them, said hangers being arranged one behind the other, but their planes intersecting, the end of the shaft being supported on both said hangers; substantially as described.

5. In an anti-friction bearing, the supporting blocks E, the obliquely arranged hangers C having knife edge pivots supported on the blocks E upon opposite sides of the vertical plane of the axis of the shaft, said hangers having also bearing surfaces D upon which the shaft B rests; substantially as described.

6. As an element in an anti-friction bearing, the triangular shaped hanger C provided with the knife edge pivot F, the screw threaded shank and the balance weight G thereon, said triangular hanger having its base formed on a curved surface; substantially as described.

7. In combination with a shaft an anti-friction bearing comprising hangers supported on knife edge pivots in the same horizontal plane but in different vertical planes, said shaft being supported in a vertical plane between the vertical planes of the pivots; substantially as described.

In testimony whereof I affix my signature in presence of two witnesses.

ORVILLE B. JOHNSON.

Witnesses:
J. C. CLARK,
WM. C. TYLER.